250-203.R 56

Sept. 20, 1966 J. S. ZUCKERBRAUN 3,274,393

SINGLE MODULATION STAR TRACKER

Filed Oct. 10, 1962 2 Sheets-Sheet 1

INVENTOR.
JACOB S. ZUCKERBRAUN

OSTROLENK, FABER, GERB & SOFFEN
ATTORNEYS

Sept. 20, 1966 J. S. ZUCKERBRAUN 3,274,393

SINGLE MODULATION STAR TRACKER

Filed Oct. 10, 1962 2 Sheets-Sheet 2

INVENTOR.
JACOB S. ZUCKERBRAUN
BY
OSTROLENK, FABER, GERB & SOFFEN
ATTORNEYS

United States Patent Office 3,274,393
Patented Sept. 20, 1966

3,274,393
SINGLE MODULATION STAR TRACKER

Jacob S. Zuckerbraun, New York, N.Y., assignor to Kollsman Instrument Corporation, Elmhurst, N.Y., a corporation of New York Filed Oct. 10, 1962, Ser. No. 229,645.
9 Claims. (Cl. 250—233)

This invention relates to a radiation tracking means and more specifically relates to a device for tracking a light source as a star or other celestial body which operates on a single modulation system which utilizes raster phase information for high accuracy tracking.

Light tracking devices are well known to the art and are typically described in U.S. Patent 3,002,096 to Eckweiler et al. and assigned to the assignee of the present application.

Arrangements of the type set forth in the above noted patent utilize a double modulation scanning technique which requires a shutter and a raster which each modulate the light source.

The raster which is formed of a plurality of closely spaced alternating opaque and transparent lines are rapidly moved across the image of the light source being tracked to provide a carrier when a light source is in the field of view. This carrier is then amplitude modulated by a low speed shutter. The phase of the shutter modulation is then used to servo the tracking telescope.

In these systems, and when the light source has been tracked to a null position, the amplitude modulation caused by the shutter disappears and only the carrier signal from the raster remains. The carrier signal is at half amplitude because of the shutter and serves as a presence indication of the light source being tracked.

The principle of the present invention is to utilize the phase information provided by the raster to servo the tracking telescope and to eliminate the shutter mechanism.

In utilizing the raster signal, the previously high speed raster now rotates at a relatively low speed which is, for example, of the order of one revolution per minute where a raster would typically have 7200 opaque lines.

This is to be contrasted to the relatively high speed rotation of the previously utilized raster which has been, for example, sufficient to create a carrier frequency of the order of 48 kilocycles.

Accordingly, the primary object of this invention is to provide a novel wide field tracker having very high accuracy.

Another object of this invention is to provide a novel light source tracking device which has an acquisition field of from ½ to 1° with a high accuracy of the order of 5 seconds of arc.

Another object of this invention is to provide a novel single modulation tracking mechanism which can be used with or without gimbals.

A further object of this invention is to provide a novel single modulation light tracking mechanism which will give a higher signal-to-noise ratio than a shutter-raster modulation system.

A further object of this invention is to provide a novel tracking mechanism which eliminates the need for gain control circuits in the electronics associated with the tracking mechanism.

A still further object of this invention is to provide a novel tracking mechanism in which the amplitude of the presence signal is constant and independent of the position of the image of the light source being tracked in the field of view.

A still further object of this invention is to provide a novel tracking mechanism which permits the use of electronic circuitry having a linear error transfer characteristic, either analog or digital, which is independent of star magnitude or gain levels.

These and other objects of this invention will become apparent from the following description when taken in connection with the drawings, in which.

FIGURES *5a*, *5b* and *5c* indicate the image of a light source at different positions with respect to the field of view.

FIGURES *6a*, *6b* and *6c* illustrate the light intensity passing through the raster as a function of motion of the raster for FIGURES *5a*, *5b* and *5c* respectively.

Figures 1, 2, 3, 4:
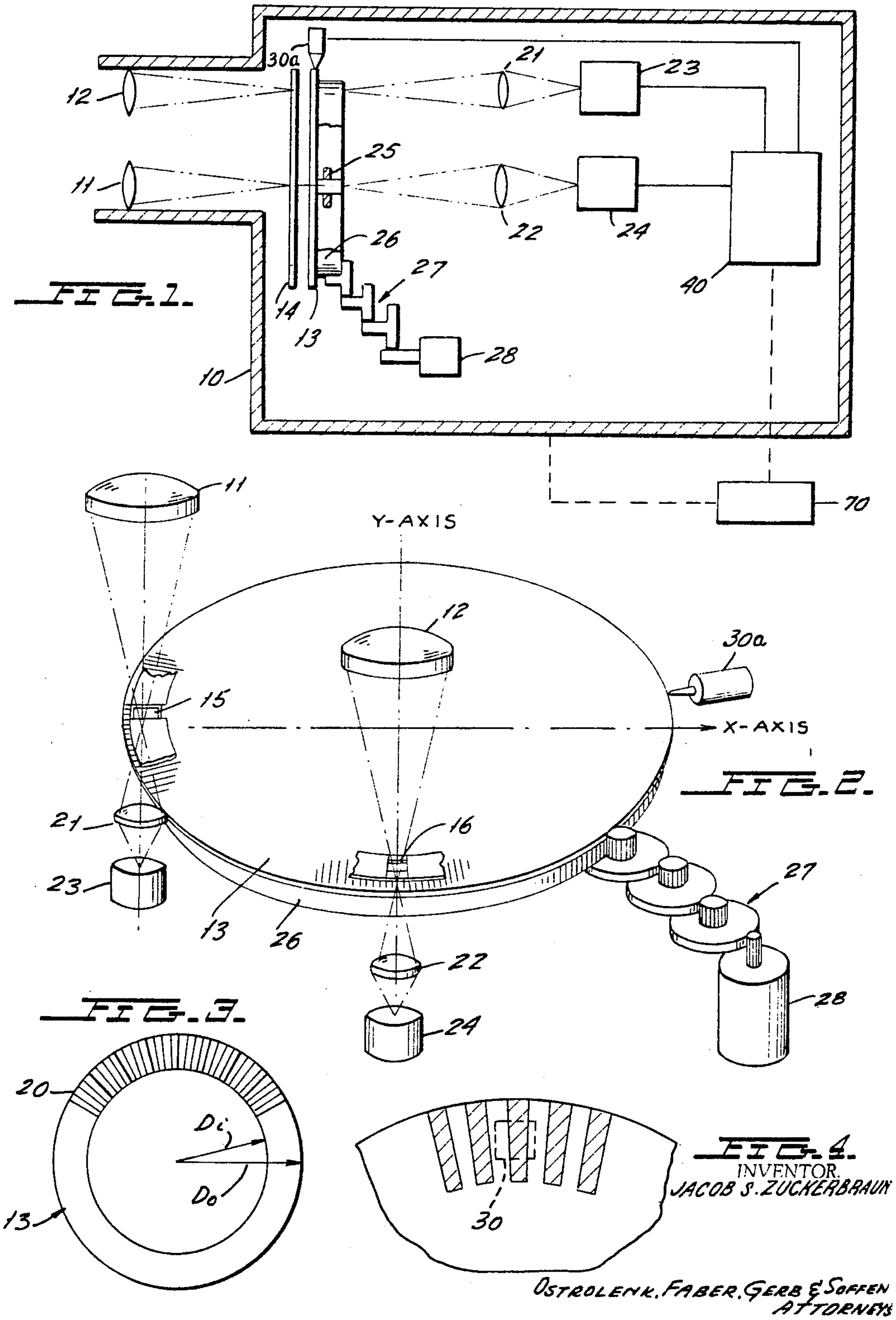
FIGURE 1 is a schematic side view through the housing of a star tracking mechanism.
FIGURE 2 is a perspective view of the novel tracking mechanism of the invention.
FIGURE 3 illustrates a front plan view of a typical raster disc used in the mechanism of FIGURES 1 and 2.
FIGURE 4 shows an enlarged section of the raster disc of FIGURE 3 with the field of view indicated in dotted lines.

FIGURE 7 shows a block diagram of the electronics utilized for the output of one of the scanning mechanisms of FIGURES 1 and 2.

Referring first to FIGURES 1 through 4, I have illustrated a housing 10 (FIGURE 1) which can contain the complete scanning mechanism. The scanning mechanism as best shown in FIGURES 1 and 2 includes a first and second objective lens 11 and 12 which gather the light from the source to be tracked. Lens system 11 is for the azimuth tracking portion of the system while lens system 12 is for the altitude tracking portion of the system.

A raster disc 13 is placed in the focal plane of lenses 11 and 12 and has a mask 14 placed in front thereof which has apertures 15 and 16 therein which are in registry with the axis of lenses 11 and 12 respectively. Apertures 15 and 16 are spaced from one another by 90°.

The raster disc 13 as shown in FIGURE 3 is formed of a disc which could be metallized to have a predetermined number of opaque lines 20 thereon.

The outer diameter of radially extending raster lines may have an outside diameter of $d_0$ of four inches and an inside diameter $d_1$ of 3 inches. In a typical embodiment of the invention, 7200 opaque lines would be formed on the disc.

Immediately behind apertures 15 and 16 there are provided condensing lens systems 21 and 22 respectively which are arranged to focus the light passing through apertures 15 and 16 on photosensitive elements 23 and 24 respectively. The raster disc 13 is rotatably mounted in the schematically illustrated bearing 25 shown in FIGURE 1 and is provided with an extending drum 26 which has gear teeth formed therein to mesh with the output gear of speed reducing gear train 27. The input of speed reducing gear train 27 is connected to a synchronous motor 28, whereby the synchronous motor 28 and gear train 27 are so arranged as to rotate raster 13 at a relatively low speed which is, for example, of the order of 1 r.p.m.

Referring now to FIGURE 4, which illustrates an enlarged section of the rim of the raster disc, the dotted block 30 illustrates the field of view permitted by the mask apertures 15 and 16 with relation to the raster lines.

Note that the raster lines moving through aperture 15 are perpendicular to the raster lines moving through aperture 16 to permit simultaneous scanning of a given light source along two axes.

It will be observed from FIGURE 4 that field of view 30 is a square field of view which has a width such that occulting lines and one clear space will encompass the field of view.

A reference probe 30*a* is then provided adjacent the metallized lines of the raster where the reference probe 30*a* could, for example, be of the capacitive pickup type where the probe point serves as one electrode of a capacitor while the adjacent metallized raster line serves as a second electrode of the capacitor. Accordingly, a signal related to the phase and speed of rotation of the raster disc can be obtained from the reference probe 30*a*.

Referring to FIGURES *5a, 5b* and *5c,* I have illustrated the square field of view 30 in dotted lines in conjunction with two raster lines 31 and 32 which move to the right as illustrated by the arrow. The image of the light source being tracked is then shown as the circular image 33. In FIGURE 5*a*, the image 33 is shown to be somewhat to the left of the center field of view 30 whereupon as raster line 31 moves to the position previously occupied by raster line 32, the intensity of the light passing through aperture 30 will be modulated as indicated in FIGURE 6*a*, where the horizontal axis indicates the motion X of raster line 31 from its present position to the position presently occupied by line 32 while the vertical axis represents light intensity I.

Figure 6A:
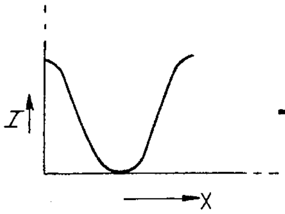
Figure 5B:
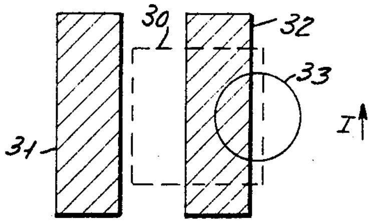
Figure 6B:
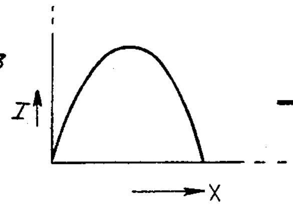

FIGURE 6*b* illustrates intensity as a fuction of raster line position when the star image 33 is off to the right of the field of view.

It will be observed that the signal has reversed in phase from FIGURE 6*a* whereby it can be understood that positional information can be easily derived from the output signal.

Figure 5:
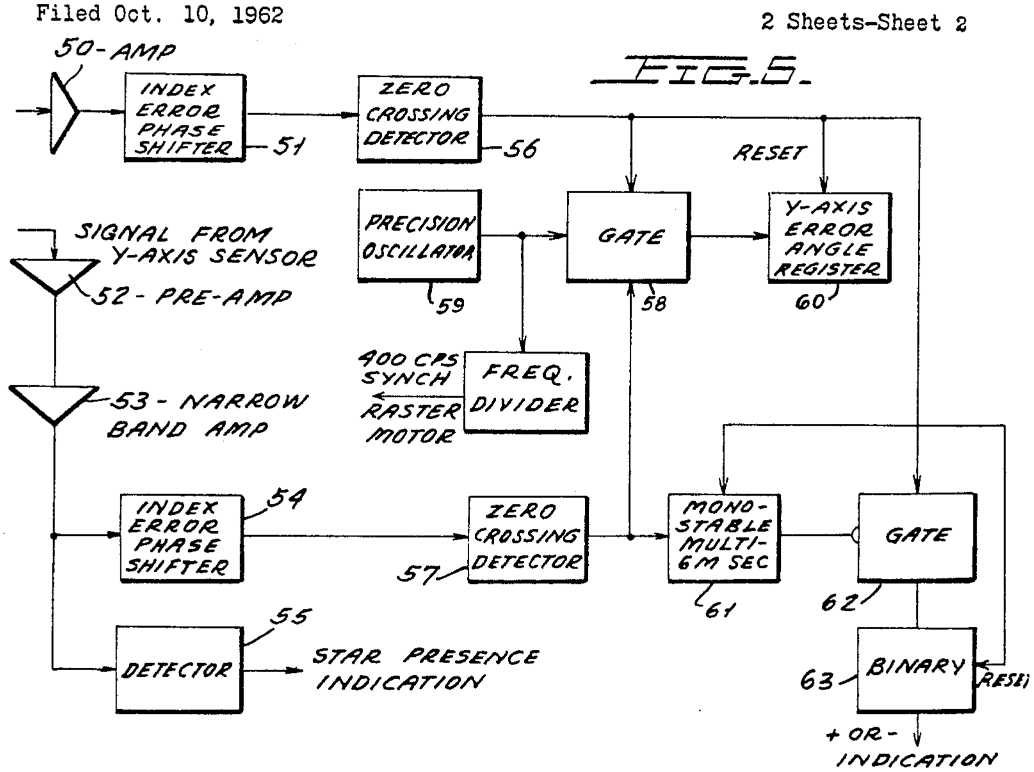
Figure 5A:
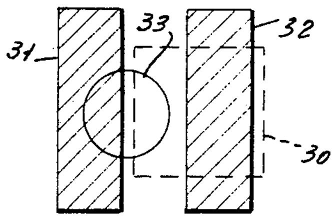
Figure 5C:
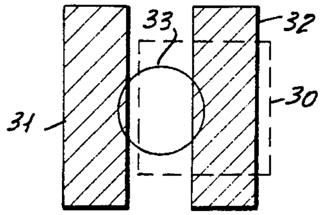
Figure 6C:
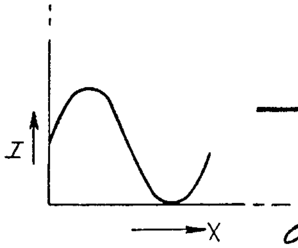

When the star is in its central position as shown in FIGURE 5*c*, an output signal which has a frequency double that of FIGURE 6*a* and 6*b* is developed whereupon the signals of FIGURES 6*a* and 6*b* and 6*c* can be used to servo the tracking system.

In operation, and as illustrated schematically in FIGURE 1, the output of photosensing means 23 and 24, are applied to electronic circuitry 40 along with a signal from probe 30*a* which permits comparison of the phase information derived from photosensing devices 23 and 24 to a fixed phase.

Where a phase detector is utilized which is capable of resolving one degree of electrical phase, an error which is equal to $\frac{1}{360}$ of the field of view can therefore be detected.

This will be described more fully hereinafter.

The system is initially adjusted and fixed so that when a star image or image of some other similar light source is exactly in the center of the field of view the phase difference between the star signal and the reference signal is zero. The output of the system may then become a number of pulses together with a sign indication which gives the direction of deviation of the star from the scanning mechanism. Therefore, the output is a linear function of the error angle.

Moreover, and since the novel tracker operates on a phase-difference principle, it will be readily understood that the slope of the output error transfer characteristic is independent of both the sensor gain and star magnitude. Therefore, automatic gain control circuitry is not required for proper operation of the system.

It will be recognized that the novel tracking mechanism of the invention measures the error between the center of the field 30 and the "center of gravity" of the star image. Therefore, so long as the shape of the image remains unchanged for stars of different color temperatures, and for different locations in the field no significant tracking errors are introduced by the optics.

In order to obtain sufficiently high signal-to-noise ratio with substatially no aberration errors, an F/2 objector having a two inch diameter may be satisfactorily employed. The photosensitive devices 23 and 25 may be type 1P21 photo multipliers.

Assuming that a first magnitude star is to be tracked which produces a typical illumination of $12.7\times10^{-8}$ lum./ft.$^2$, the flux gathered by two inch objectives will be $2.75\times10^{-9}$ lumins.

Assuming that zodiacal light and other sources of illumination are small as compared to the thermionic dark current noise of the photosensing tubes, and with the tubes operated at an extreme temperature of 70° C., the equivalent noise input illumination will be $1.5\times10^{-12}$ lum. at 2870° Kelvin in a one cycle per second bandwidth. The S–4 line sensitivity to 10,000° K. light is approximately 2.5 times greater than at 2870° K. illumination. The signal-to-noise ratio produced by first magnitude star at a 25 cycles per second bandwidth can be shown to be 915. Assuming an optical efficiency of 70% the signal-to-noise ratio becomes approximately 640 or 41 db. Thus, for integration times of the order of 10 seconds, the error introduced by noise will average out to a negligible quantity.

The electronics which may be used for either the X-axis scanning (objective 11) or Y-axis scanning (objective 12) is illustrated in block diagram in FIGURE 5 for the case of Y-axis scanning.

The signal from probe 30*a* is applied to amplifier 50 which is in turn connected to an index error phase shifter 51. The signal derived from photosensor 24 is applied to a preamplifier 52 and a narrow band amplifier 53 which is in turn connected to the index error phase shifter 54 for the star signal.

The output of amplifier 53 is also connected to a detector 55 which gives a star presence indication without regard to the position of the star image in the scanning field.

The index error phase shifters 51 and 54, are initially adjusted as indicated above so that when the star is in the center of the field, the star and reference signals are in phase.

The output of index error phase shifters 51 and 54 are connected to zero crossing detectors 56 and 57 which operate to respectively open and close the count gate 58 to allow precision pulses from precision oscillator 59 to be registered.

Therefore, where the raster disc speed is 1 r.p.m. the star and reference signals will have a frequency of 120 cycles per second whereby a precision oscillator having a frequency of 43.2 will provide one pulse per electrical degree of phase difference. Therefore, one pulse indicates five seconds of arc tracking error.

It will be noted that the negative pulses from the reference signal detector are used to reset the register 60 which is driven from oscillator 59 through gate 58 after each cycle.

Thus, the circuitry provides a measure of the phase angle error and thus, the displacement of the star image from the center of the field of view in the error angle register 60.

To obtain an indication of the sign of this error (whether to the left or right of the center of the field of view), a monostable multivibrator 61, gate 62 and binary 63 are provided. A positive pulse from the star signal detector obtained through the zero crossing 57 will initiate a 6 millisecond pulse from the monostable multivibrator while a negative pulse from the reference signal detector taken from zero crossing detector 56 will terminate the pulse.

Therefore, the presence of a signal from binary 63 indicates that the signal from the Y-axis sensor leads the reference signal while a negative signal indication from binary 63 indicates that the signal from the Y-axis sensor lags the reference signal.

The information so derived from the electronic circuitry of FIGURE 7 may now clearly be applied by usual well known techniques to the servo mechanism 70, schematically illustrated in FIGURE 1 which can control the angular position of the housing 10 so that the telescope is constantly aimed at the light source being tracked.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A tracking mechanism for tracking a source of radiation comprising a telescope objective means, a scanning means, and a photosensing means; said scanning means comprising a raster movable with respect to a masked aperture, said aperture being centered in the optical axis of said telescope objective means; said raster having a series of spaced lines opaque to said radiation spaced by areas transparent to said radiation; said aperture having a width equal to the width of one opaque area plus one transparent area of said raster; said photosensing means receiving the radiation passed through said aperture and modulated by said raster; said raster disk being rotated at a constant speed with respect to said aperture.

2. The device substantially as set forth in claim 1 wherein the order of 120 opaque lines per second pass said aperture.

3. The device substantially as set forth in claim 1 wherein said raster is found on the periphery of a rotatable disk.

4. The device substantially as set forth in claim 3 wherein said disk is rotated at approximately 1 cycle per minute.

5. A tracking mechanism for tracking a source of radiation comprising a telescope objective means, a scanning means, and a photosensing means; said scanning means comprising a raster movable with respect to a masked aperture, said aperture being centered in the optical axis of said telescope objective means; said raster having a series of spaced lines opaque to said radiation spaced by areas transparent to said radiation; said aperture having a width equal to the width of one opaque area plus one transparent area of said raster; said photosensing means receiving the radiation passed through said aperture and modulated by said raster; said raster disk being rotated at a constant speed with respect to said aperture; said opaque lines being of electrically conductive material deposited on a transparent base; and a stationary probe means capacitively coupled to said conductive lines to generate a reference signal.

6. A single modulation scanning mechanism for a star tracker comprising aperture means for receiving the light of a star to be tracked and a raster means for modulating the light passing through said aperture; said raster means comprising a series of alternately opaque and transparent areas positioned to intercept light passing through said aperture and means for moving said raster with respect to said aperture; the width of said aperture being approximately equal to the width of one of said opaque areas plus one of said transparent areas.

7. The device substantially as set forth in claim 6 wherein the order of 120 opaque lines per second pass said aperture.

8. The device substantially as set forth in claim 6 wherein said raster is found on the periphery of a rotatable disk.

9. The device substantially as set forth in claim 8 wherein said disk is rotated at approximately 1 cycle per minute.

References Cited by the Examiner

UNITED STATES PATENTS

| | | | |
|---|---|---|---|
| 2,961,545 | 11/1960 | Astheimer et al. | 250—203 |
| 3,012,148 | 12/1961 | Snyder et al. | 250—233 X |
| 3,080,485 | 3/1963 | Saxton | 250—203 |
| 3,138,712 | 6/1964 | Aroyan | 250—233 X |

RALPH G. NILSON, *Primary Examiner.*

WALTER STOLWEIN, *Examiner.*

J. D. WALL, *Assistant Examiner.*